Patented Nov. 19, 1940

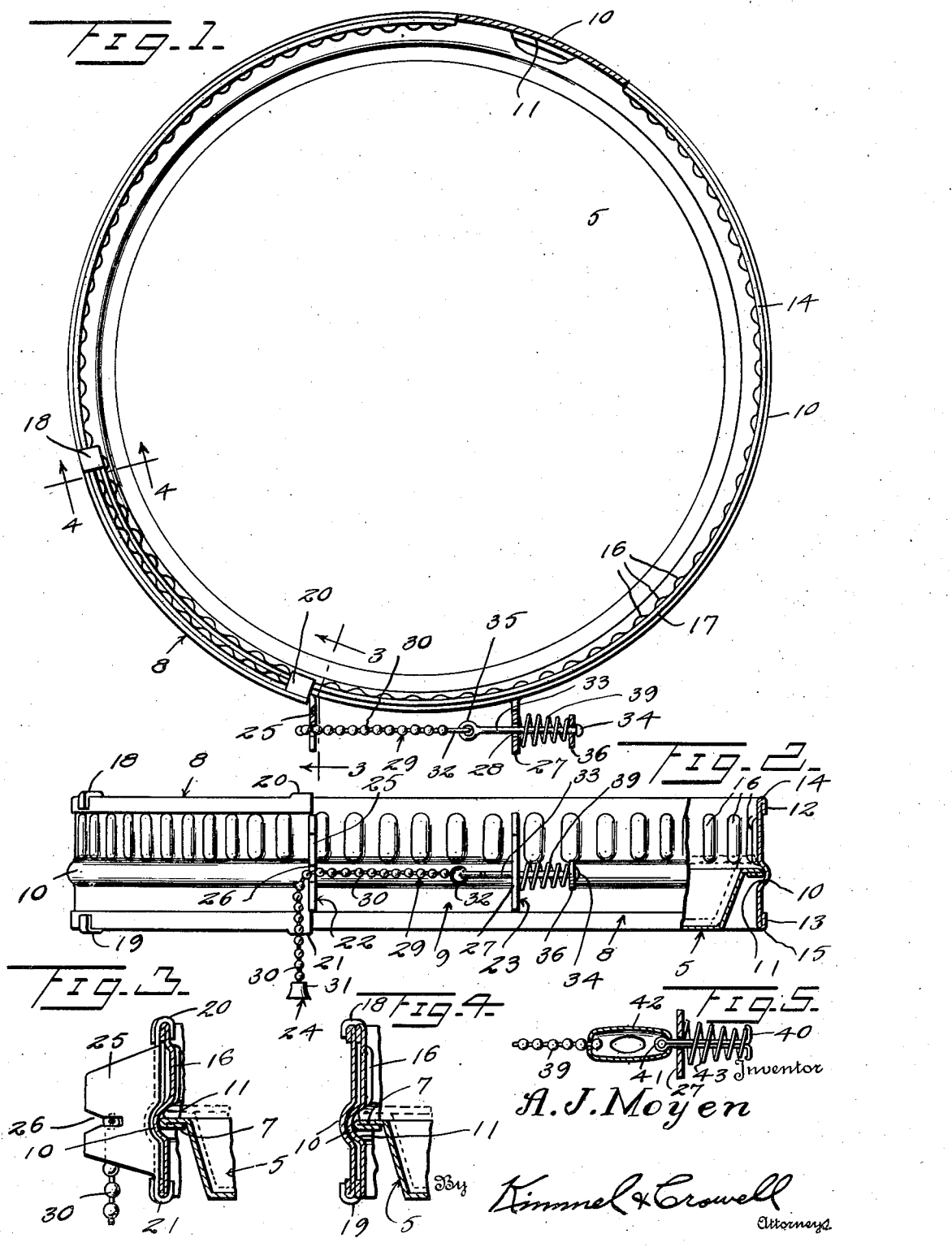

2,222,512

UNITED STATES PATENT OFFICE 2,222,512

ATTACHMENT FOR PIE PLATES OR PANS

Arthur J. Moyen, Bridgton, Maine

Application April 9, 1940, Serial No. 328,793

6 Claims. (Cl. 53—6)

This invention relates to an attachment for pie plates or pans.

The invention aims to provide, in a manner as hereinafter set forth, an attachment for use in connection with a pie plate or pan to prevent juice from the pie, during the baking of the latter, from running over into the oven.

The invention further aims to provide means, in a manner as hereinafter referred to, for confining the juice from and during the baking of a pie about the latter to thereby prevent the juice falling on the bottom of the oven.

The invention further aims to provide means, in a manner as hereinafter set forth, for substantially maintaining all of the juice formed, during the baking of a pie about the latter thereby resulting in a decidedly more delectable food product.

The invention further aims to provide means, in a manner as hereinafter set forth, to prevent the burning or scorching of juices extracted from a pie during the baking of the latter.

The invention further aims to provide, in a manner as hereinafter set forth, an adjustable attachment for a pie plate or pan for the aims heretofore referred to.

The invention further aims to provide an attachment for the purpose set forth, which is simple in its construction and arrangement, strong, durable, compact, quickly installed with respect to a pie plate or pan, conveniently adjusted to fit various sizes of plates and pans, readily latched in adjusted position, thoroughly efficient in use for the purpose intended thereby, and comparatively inexpensive to manufacture.

Embodying the aims aforesaid and others which may hereinafter appear, the invention consists of the novel construction, combination and arrangement of parts as will be more specifically referred to and illustrated in the accompanying drawing, wherein is shown an embodiment of the invention, but it is to be understood that changes, variations and modifications may be resorted to which fall within the scope of the invention as claimed.

In the drawing:

Figure 1 is a top plan view of the attachment when latched,

Figure 2 is a view, partly broken away and partly in section looking towards one side of the attachment and further showing the adaptation of the attachment with a pie plate or pan, the latter being shown in cross section, Figure 3 is a section on line 3—3, Figure 1, Figure 4 is a section on line 4—4, Figure 1, and Figure 5 is a fragmentary view in front elevation of a modified form of latching member.

As is well known pie plates or pans now in general use consist of a flared annular body part which is open at its top and closed at its bottom. The body part at its top is formed with an outwardly directed endless flat flange. In Figure 1 of the drawing the plate or pan is generally indicated at 5, its body part at 6 and its flange at 7.

The attachment, in accordance with this invention, is generally indicated at 8 and it is of a form to not only encompass pan 5, but to correlate with the flange 7 of the latter to position the attachment in its operative position.

The attachment 8 includes a vertically extending circular juice confining member or band 9 disposed on its lower lengthwise edge and formed from a body of thin spring metal of strap-like form of the desired width and length. The strap from which the member 9 is formed is folded in a manner to have its end terminal portions disposed in overlapping relation to provide a said member 9 in the form of a split annulus for encompassing the pie plate or pan. The diameter of member 8 may be increased or decreased to provide for it being used in connection with pie plates or pans of different diameters.

The member 9 from end to end thereof is formed with an external hollow rib 10 which forms member 9 with an inwardly opening groove 11 on its inner face. The rib 10 in vertical section is substantially of semi-circular contour. The groove 11 is intersected by the lengthwise median of member 9, but that portion of groove 11 above said median is of less width than the portion below.

The upper and lower terminal portions of the strap which forms the member 9 are indicated at 12, 13, are oppositely bent against the outer face of said strap for the purpose of forming said member 9 with rounded lengthwise edges 14, 15, and further are for reinforcing the said member 9 at its top and bottom.

The member 9 from one end to its other end is formed with alternating inner and outer vertical corrugations, of like form designated 16, 17 respectively. The inner corrugations 16 have their upper ends substantially aligned with the lower edge of terminal portion 12 and their lower ends spaced slightly above the top of the groove 11. The outer corrugations 17 extend from the lower edge of terminal portion 12 to a point slightly above the top of rib 10. That portion of the member 9 extending from the upper end of the corrugations to the edge 14 of member 9 is smooth.

That portion of the member 9 extending from the bottom of the rib 10 to the edge 15 of member 9 is smooth.

The member 9 at one end is formed with a pair of vertically disposed oppositely extending angle-shaped combined confining and guiding elements 18, 19 which are integral with and extend from the edges 14, 15 respectively. The member 9 at the other end thereof is formed with a pair of vertically disposed oppositely extending angle-shaped combined confining and guiding elements 20, 21 which are integral with and extend from the edges 14, 15 respectively. The elements 18, 19 oppose the outer face of an end terminal portion of the member 9. The elements 20, 21 oppose the inner face of the other end terminal portion of the member 9. The elements 18, 19, 20, 21 confine one end terminal portion of the member 9 with the other end terminal portion of the latter in opposed relation, and such elements slidably connect such end terminal portions together. The said elements coact with the said end terminal portions to arrange member 9 in the form of a split annulus. When the said end terminal portions are in overlapped relation the corrugations of one of said portions removably engage in the corrugations of the other one of said portions.

For the purpose of releasably maintaining the member 9 in its adjusted position and in encompassing relation with respect to the pie plate or pan a spring controlled latching structure is provided and is connected to the outer face of member 9. The structure comprises a combined keeper, guide and coupling element 22, a combined guide and coupling element 23 and a latching element or member 24. The element 22 is in the form of a vertical plate 25 disposed at right angles to and having its inner side edge integral with one end of member 9. The plate 25 is formed with a Y-shaped notch or cutout 26 opening at its outer side edge and spaced from its top and bottom edges. The element 23 is in the form of a vertical plate 27 integral at its inner side edge with the outer face of member 9 at a point removed from the other end of the latter. The plate 27 opposes plate 25 in spaced relation and it is formed with an opening 28 which aligns with the inner portion of cutout 26. The latching element or member 24 includes a flexible chain 29 formed of a series of pivotally connected together spaced spherical bodies 30 each constituting a holder. The chain 29 at its outer end is formed with a handle piece 31 of a size greater than any one of the bodies 30, and said chain at its inner end is provided with an eye 32. The chain is to be inserted into the plate 25, through the notch 26 when the latching structure is to maintain the member 9 in its adjusted position. The latching is accomplished by a pair of bodies 30 being arranged against opposite faces of the plate 25 at the reduced or inner portion of the notch 26. The said reduced inner portion of notch 26 is of less width than the diameter of the spherical bodies, but of a width to permit of receiving the connections between said bodies. The element 24 includes a spring controlled rod 33 slidably mounted in the opening 28 of the plate 27. The rod 33 at one end is formed with a head 34 and at its other end with an eye 35 which is connected to the eye 32 on the inner end of chain 29. Arranged on rod 33 and bearing against the head 34 is an abutment 36. Surrounding the rod 33 and interposed between plate 27 and abutment 36 is a controlling spring 37 for the rod 33. The spring 37 acts to bind a selected pair of bodies 30 against the opposite faces of the plate 27 when chain 29 has a part thereof arranged in the inner portion of the notch 26 to prevent the latching structure, when active, to be accidentally released. The plate 25 couples the chain 29 to the member 9 when the chain is mounted in said plate. The plate 27 permanently couples rod 33 to member 9. The length of chain 29 is such as to permit it coacting with plate 25 for latching the member 9 in adjusted position when said member 9 is used in connection with pie plates or pans of different diameters.

The manner of arranging the attachment relative to a pie plate or pan is as shown by Figure 2 with the member 9 having a part depending below flange 7 and encompassing the pie plate or pan and a part extended above the flange 7 for the purpose of preventing the juices from the pie running over into the oven and also for the purpose of confining the juices about the pie during the baking of the latter. The flange 7 is extended into the groove 11, and when member 9 is latched to the pie plate or pan the separation of the attachment from the pie plate or pan is prevented until the attachment is unlatched. When the attachment is latched the wall of groove 11 bears against the outer edge of flange 7.

The modified form of latching member shown by Figure 5 is generally indicated at 38 and it includes a chain 39 which corresponds to the chain 29 with this exception that chain 39 is not formed with an eye 32. The member 38 also includes a cotter pin 40 which has its head 41 connected to the inner end of chain 39 by a coupler 42. The latter provides a flexible connection between the chain and cotter pin. The latter extends through the opening of plate 27 and has mounted thereon a coiled spring 43. The cotter pin 40 is bent around the outer coil of spring 43. The latter is confined on the cotter pin 41 between the bent end of the latter and the plate 27.

What I claim is:

1. An attachment for the purpose set forth including an adjustable split band having its terminal portions slidably connected together in overlapping relation, said band being formed lengthwise thereof with an inwardly opening groove, and means secured to the outer face of the band for releasably holding it in adjusted position.

2. An attachment for the purpose set forth including an adjustable split band formed with a pair of lengthwise edges and for disposing on one of said edges, said band being formed lengthwise with an inwardly opening groove spaced from said edges, and means secured to and extended from the outer face of the band for latching the latter in its adjusted position.

3. In an attachment for the purpose set forth including an adjustable split band having its end terminal disposed in overlapping relation, said band being formed lengthwise with an inwardly open groove spaced from its lengthwise edges, a combined keeper, guide and coupling element extended from the outer face of the band formed with a cutout, a combined guide and coupling element extended from the outer face of the band formed with an opening and aligned in spaced relation with said other element, and a spring controlled latching element slidably mounted in said opening for extension through said cutout and coacting with said combined keeper, guide and coupling element for releasably retaining said band in adjusted position.

4. In an attachment for the purpose set forth including an adjustable split band having its end terminal disposed in overlapping relation, said band being formed lengthwise with an inwardly open groove spaced from its lengthwise edges, a combined keeper, guide and coupling element extended from the outer face of the band formed with a cutout, a combined guide and coupling element extended from the outer face of the band formed with an opening and aligned in spaced relation with said other element, a spring controlled latching element slidably mounted in said opening for extension through said cutout and coacting with said combined keeper, guide and coupling element for releasably retaining said band in adjusted position, said combined keeper, guide and coupling element being connected to one end of and disposed outwardly at right angles to said band, and said combined guide and coupling element being connected to the outer face and spaced from the other end of the band, said combined guide and coupling element being disposed at right angles to the band.

5. An attachment for the purpose set forth including an adjustable split band having its terminal portions slidably connected together in overlapping relation, said band being formed lengthwise thereof with an inwardly opening groove, and means secured to the outer face of the band for releasably holding it in adjusted position, said means including a spring controlled latching member spaced from the outer face of the band.

6. An attachment for the purpose set forth including an adjustable split band formed with a pair of lengthwise edges and for disposing on one of said edges, said band being formed lengthwise with an inwardly opening groove spaced from said edges, and means secured to and extended from the outer face of the band for latching the latter in its adjusted position, said means including a spring controlled latching member spaced from the outer face of the band.

ARTHUR J. MOYEN.